United States Patent [19]

Ogawa

[11] Patent Number: 5,138,478
[45] Date of Patent: Aug. 11, 1992

[54] OPTICAL BEAM SCANNING APPARATUS
[75] Inventor: Hideaki Ogawa, Kyoto, Japan
[73] Assignee: Dainippon Screen Mfg. Co., Ltd., Japan
[21] Appl. No.: 734,621
[22] Filed: Jul. 23, 1991
[30] Foreign Application Priority Data Jul. 25, 1990 [JP] Japan .................................. 2-197449

[51] Int. Cl.⁵ .......................... G02B 26/00; G11B 7/09; G03G 15/04
[52] U.S. Cl. ..................................... 359/204; 359/211; 250/235; 346/108
[58] Field of Search ............... 359/196, 197, 198, 204, 359/205, 209, 211, 212, 213, 216, 305, 312; 250/234, 235, 236; 346/108, 109, 160; 358/494, 496

[56] References Cited

U.S. PATENT DOCUMENTS

| | | | |
|---|---|---|---|
| 4,449,215 | 5/1984 | Reno | 358/342 X |
| 4,725,855 | 2/1988 | Arimoto et al. | 346/108 |
| 4,760,407 | 7/1988 | Arimoto et al. | 346/108 |
| 4,878,066 | 10/1989 | Shiraishi | 346/108 |
| 5,006,704 | 4/1991 | Mochizuki et al. | 250/235 |
| 5,006,705 | 4/1991 | Saito et al. | 250/235 |

OTHER PUBLICATIONS

"Piezodriven 50-μM Range Stage with Subnanometer Resolution", Rev. Sci. Instrum., vol. 49, No. 12, Dec., 1978.

Primary Examiner—Constantine Hannaher
Assistant Examiner—Edward J. Glick
Attorney, Agent, or Firm—Ostrolenk, Faber, Gerb & Soffen

[57] ABSTRACT

An optical beam scanning apparatus includes a beam-to-beam distance adjuster (300) for rotationally displacing a beam splitter (301). The beam-to-beam distance adjuster (300) comprises three arm members (312, 313, 314) which are linked to each other through notch portions (323, 324). A member (315) is linked to the arm member (313). The beam splitter (301) is secured on the member (315) from which a plate spring (316) extends. A projection member (317) is provided between a leading edge portion of the plate spring (316) and the arm member (314). A rotation angle of the beam splitter (301) can be changed by actuating three arm members (312, 313, 314) in link motion, whereby a beam-to-beam distance between two beams ($B_a$, $B_b$) can be also changed.

7 Claims, 20 Drawing Sheets

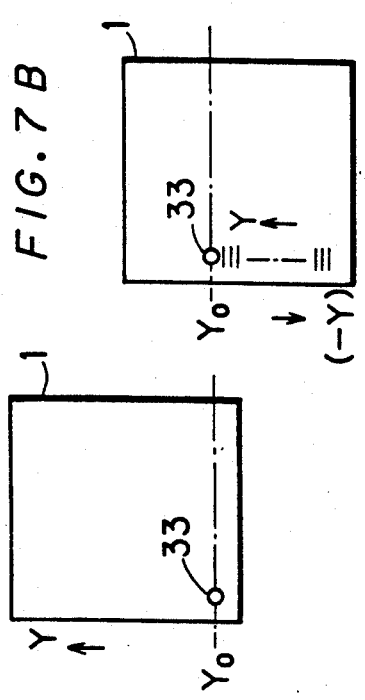
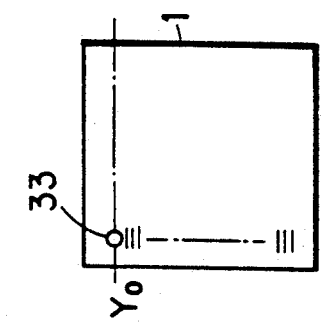
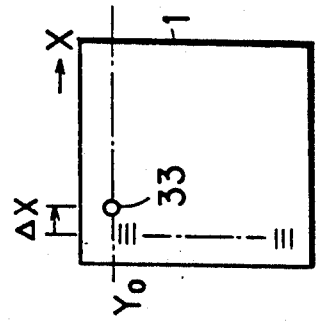
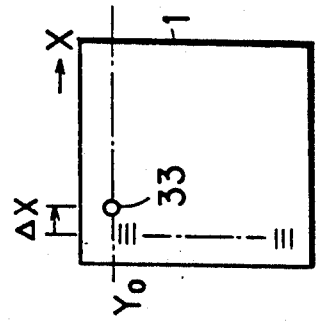
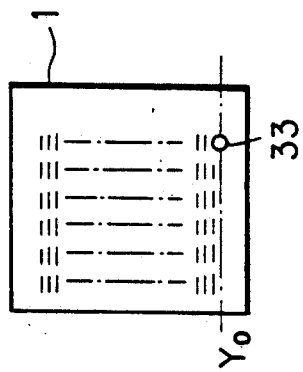
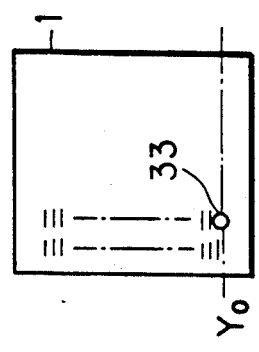
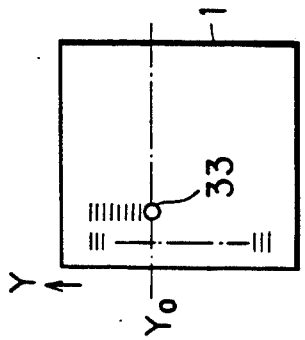

OPTICAL BEAM SCANNING APPARATUS

BACKGROUND OF THE INVENTION

1. Field of the Invention

The present invention relates to an optical beam scanning apparatus in which a plurality of optical beams modulated in accordance with image signals are cyclically deflected by deflecting means and are then scanned to record images on a photosensitive material.

2. Description of the Prior Art

A short drawing time is desired in an optical beam scanning apparatus such as a laser plotter for recording an image as a black-and-white image on a photosensitive material and a scanner for producing a printing plate by recording a gradation image consists of halftone dots on a photosensitive material. For this reason, an optical beam scanning apparatus which scans a plurality of laser beams is commonly used.

In such an optical beam scanning apparatus, one thing is important, that is, a varying beam-to-beam distance. If drawing density changes, a beam-to-beam distance must change accordingly. To fulfill this demand, beam-to-beam distance adjusters have been used. For example, a beam-to-beam distance adjuster disclosed by the inventor of the present invention in the patent application of Japanese Patent Application No. 1-89460 (heretofore referred to as "the precedent application").

FIG. 1 is an explanatory diagram illustrating principles of beam-to-beam distance adjustment according to which a beam-to-beam distance adjuster is constructed. In FIG. 1, a beam-to-beam distance adjuster comprises a beam director 301 which is the same in structure as a beam splitter. With its half mirror surface 302, the beam director 301 allows a first beam $B_1$ to partially pass through the same to become a beam $B_a$ while reflecting a part of a second beam $B_2$ to make it a reflected beam $B_b$. The beams $B_a$ and $B_b$, directed by the beam director 301 which is rotationally displaced according to an adjustment rule described later, intersect in a rear side at a predetermined point $P_C$ at an angle of $\theta$. At the intersection $P_C$, an acousto-optic deflector 213 is disposed to cyclically deflect the beams $B_a$ and $B_b$. The beams $B_a$ and $B_b$ enter the AOD 213 where they would be deflected, and are then directed to a scanning lens 216 where they would be converted to become parallel beams. The distance between the intersection $P_C$ and the scanning lens 216 is equal to the focal length f of the scanning lens 216.

As in FIG. 1, the following relationship holds between a distance $l_0$ between the parallel beams $B_a$ and $B_b$, the intersection angle $\theta$ and the focal length f of the scanning lens 216:

$$l_0 = \theta \cdot f \tag{1}$$

Hence, the distance $l_0$ between the beams $B_a$ and $B_b$ can be properly changed by changing the intersection angle $\theta$. Still, one thing must not be forgotten in executing such beam-to-beam distance adjustment by changing the intersection angle $\theta$. The beams $B_a$ and $B_b$ must intersect at the intersection $P_C$ so that they never fail to enter the AOD 213 even if the intersection angle $\theta$ is changed. This is partly because the AOD 213 has an entrance side aperture of a rather small diameter and partly because the larger the diameter of the beams $B_a$ and $B_b$, the better focused the beams $B_a$ and $B_b$ would be on a photosensitive material 1. Simply increasing the intersection angle $\theta$ would lead to an intersection $P_C$ gradually shifting toward the beam director 301 and would finally end up in a situation that the beam $B_b$ does not enter the AOD 213, because the diameter of the beams $B_a$ and $B_b$ is customarily set equal to the diameter of the entrance side aperture of the AOD 213.

The below will describe the adjustment rule for changing the intersection angle $\theta$ while always satisfying the condition that the beams $B_a$ and $B_b$ intersect at the intersection $P_C$. As mentioned before, the beam-to-beam distance adjuster changes the intersection angle $\theta$ by rotationally displacing the beam director 301 around a predetermined rotation center $C_R$. The rotation center $C_R$ of the beam director 301 is set at a position of the element 301 of when the half mirror surface 302 is placed at a position 302a shown in FIG. 2. A distance A between the reference position of the beam director 301 and the rotation center $C_R$ depends on an optical length a which is a distance between the reference position and the intersection $P_C$. Hence, the distance A must be set relative to the optical length a.

FIG. 2 is a conceptual diagram to find how to set the distance A. It is assumed that the beams $B_a$ and $B_b$ intersect at the intersection $P_C$ at angle of $\theta$, and that the beam director 301 (not shown in FIG. 2) is rotated for an angle of $\beta$ about the rotation center $C_R$. In FIG. 2, the lines and the symbols stand for:

$P_R$ ... a reflection point on the half mirror surface 302 at which the beam $B_2$ is reflected;

$F_H$ ... a line drawn through the point $P_R$ to be parallel to the optical path of the beam $B_1$;

$F_N$ ... a normal line to the half mirror surface 302;

$F_{45}$ ... a line inclined at an angle of $\pi/4$ to th incident direction of the beam $B_2$;

$\alpha$ ... an angle between the direction of the beam $B_2$ and the line $F_N$; and h ... a height of the point $P_R$ taken from the optical path of the beam $B_1$.

In the case as above, an intersection angle between the line $F_N$ and the line $F_H$ is $\alpha-\theta$ and an intersection angle between the line $F_H$ and the beam $B_2$ and is $\pi/2$. Hence, $$(\alpha-\theta)+\alpha=\pi/2 \tag{2}$$

Since an angle between the line $F_{45}$ and the line $F_H$ is $\pi/4$, $$(\alpha-\theta)+\beta=\pi/4 \tag{3}$$

Now, eliminating $\alpha$ from Eqs. 2 and 3 yields $$\theta = 2 \cdot \beta \tag{4}$$

At the same time, $$h = a \cdot \tan\theta \tag{5}$$

and if $\theta$ is enough small, h is approximately $$h = a \cdot \theta \tag{6}$$

Hence, obtained from Eqs. 4 and 6 is $$h = 2a \cdot \beta \tag{7}$$

In addition, the following holds:

$$\tan\beta = h/A \tag{8}$$

Now, combining Eqs. 4 and 8 gives $$A = h/\tan \beta \quad (9)$$
$$= h/\tan(\theta/2)$$
$$= h(1 - \cos\theta)^{\frac{1}{2}}/(1 + \cos\theta)^{\frac{1}{2}}$$

On the other hand, Eq. 5 can be rewritten as $$\cos\theta = \cos[\tan^{-1}(h/a)] \quad (10)$$

and therefore, substituting Eq. 10 in Eq. 9 gives Eq. 11 which shows the distance A changes according to a change in the distance a.

$$A = (a^2 + h^2)^{\frac{1}{2}} + a \quad (11)$$

In Eq. 11, a and h take the following values for example:

$$a = 300 \text{ mm} \quad (12)$$

$$h = 0.04 \text{ mm} \quad (13)$$

Thus, h usually takes a pretty small value compared to a. Due to this, Eq. 11 can be regarded as Eq. 14.

$$A \approx 2a \quad (14)$$

In short, the rule for adjusting a beam-to-beam distance is summarized as follows: The beam director 301 is moved in a parallel direction while rotationally displaced about a point so as to satisfy Eq. 7, the point being twice far the optical path length a between the reference position 302a and the AOD 213 from the reference position 302a.

FIG. 3 is a diagram schematically showing a mechanism of a beam-to-beam distance adjuster disclosed in the precedent application (No. 1-89460). In FIG. 3, the beam-to-beam distance adjuster includes a four-node link mechanism 500 consists of arm members 501, 502 and 503. When, the four-node link mechanism 500 operates, this structure makes the center member 502 (that is, the beam director 301) rotate about a point $C_A$. The point $C_A$ functions as a center point of rotation for a moment. This implies that if the link mechanism 500 is designed so that a distance between the beam director 301 and the point $C_A$ takes a value of $2a$, the beam director 301 can be rotationally displaced in such a manner that the point $C_A$ serves as the rotation center $C_R$ of FIG. 1 while approximately satisfying Eq. 7.

Attention is directed here to that the beam-to-beam distance adjuster of FIG. 3 only approximately satisfies Eq. 7. Hence, as the angle $\theta$ grows, a deviation from Eq. 7 increases to such a degree that it cannot be ignored anymore. Let the distance a be 250 mm and the link mechanism 500 be dimensioned as below, for example, in order to show this.

Length of the arm member 501 ... 30 mm
Length of the arm member 502 ... 40 mm
Length of the arm member 503 ... 30 mm
Distance between the right end of the member 501 and the left end of the member 503 ... 37.6 mm Now, if the angle $\theta$ is 1.1 mrad, the beams $B_a$ and $B_b$ will intersect at a point nearly 1 mm far from the point $P_C$. If the angle $\theta$ grows to 10 mrad, the beams $B_a$ and $B_b$ will intersect at a point as far as 10 mm from the point $P_C$ and fail to enter the AOD 213.

Aside from the above, some beam-to-beam distance adjusters comprise a beam expander with magnification of $M_0$ disposed between the beam director 301 and the scanning lens 216 in order to enlarge a diameter of beams which enter the AOD 213, which would eventually increase the number of resolution points through scanning. When such is adopted, although the diameter of the beams is expanded by $M_0$ times at the beam expander, an angle between the beams becomes $1/M_0$ larger. Assume that two beams from the beam director 301 are at an angle of $\gamma$ to one another. The beams passed through the beam expander would have a relative angle of $\gamma/M_0$. Hence, two beams from the beam director 301 must be at an angle of $M_0 \cdot \theta$ to one another in order to obtain two beams entering the scanning lens 216 at an angle of $\theta$ to one another. This means that the beam director 301 must be considerably rotated. However, such would lead to an unwanted result that beams which are supposed to intersect at the point $P_C$ meet at a point far from the point $P_C$.

An apparatus shown in FIG. 4, for instance, solves the problems as above. In the apparatus, the beam director 301 is fixed to a stage 600 which is supported by piezoelectric elements 601 and 602 through notched links. In this structure, the beam director 301 is rotationally displaced in the direction of $\theta_a$ while satisfying Eq. 7 by differently extending the piezoelectric elements 601 and 602.

The beam-to-beam distance adjuster of FIG. 4, however, has a problem. Since two actuators (piezoelectric elements) must be employed, the apparatus needs complicated control and would be costly.

SUMMARY OF THE INVENTION

The present invention is directed to an optical beam scanning apparatus for deflecting a plurality of optical beams and scanning photosensitive material with the deflected optical beams, the optical beam scanning apparatus comprising: (a) means for generating a plurality of optical beams; (b) means for modulating the plurality of optical beams; (c) beam turning means for turning modulated optical beams to thereby produce a beam group consisting of optical beams which intersect each other at a prescribed point; (d) means for rotationally displacing the beam turning means to thereby change an angle of intersection of the beam group, the displacing means including: (d-1) a link mechanism comprising first to third arm members, the first and second arm members linked to each other through a first link node, the second and third arm members linked to each other through a second link node, both ends of the link mechanism supported at predetermined points through third and fourth nodes, respectively, (d-2) a supporting member connected to the beam turning means, the supporting member linked to the second arm member through a fifth link node, (d-3) an elastic member extending from the supporting member in a different direction from a longitudinal one of the second arm member, (d-4) a projection member provided between the first arm member and a leading edge portion of the elastic member, and (d-5) means for actuating the link mechanism in link motion; (e) deflecting means for periodically deflecting the beam group; and (f) focusing means for focusing each optical beam of the deflected beam group on the photosensitive material.

Preferably, the deflecting means is disposed at the point where the optical beams from the beam turning means intersect each other.

The actuating means may further comprise an actuator connected with the link mechanism and a controlling unit for controlling the actuator to extend or shrink. Further, the controlling unit may comprise: a laser source for emitting a laser beam; a mirror secured on the second arm member for reflecting the laser beam from the laser source; detector for detecting a laser beam reflected by the mirror to output a signal corresponding to a rotation angle of the mirror; and a controllor for controlling the operation of the actuator on the basis of the signal.

Accordingly, an object of the present invention is to provide an optical beam scanning apparatus which can to provide an optical beam scanning apparatus which can widely adjust a beam-to-beam distance.

Another object of the present invention is to provide an optical beam scanning apparatus with simple structure.

Still another object of the present invention is to provide an optical beam scanning apparatus which can easily control a beam-to-beam distance.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6 and 7A to 7G are diagrams explaining a scanning method;

DESCRIPTION OF THE PREFERRED EMBODIMENTS

A. Optical Beam Scanning Apparatus

A-1. Structure and Operation

Figure 5:
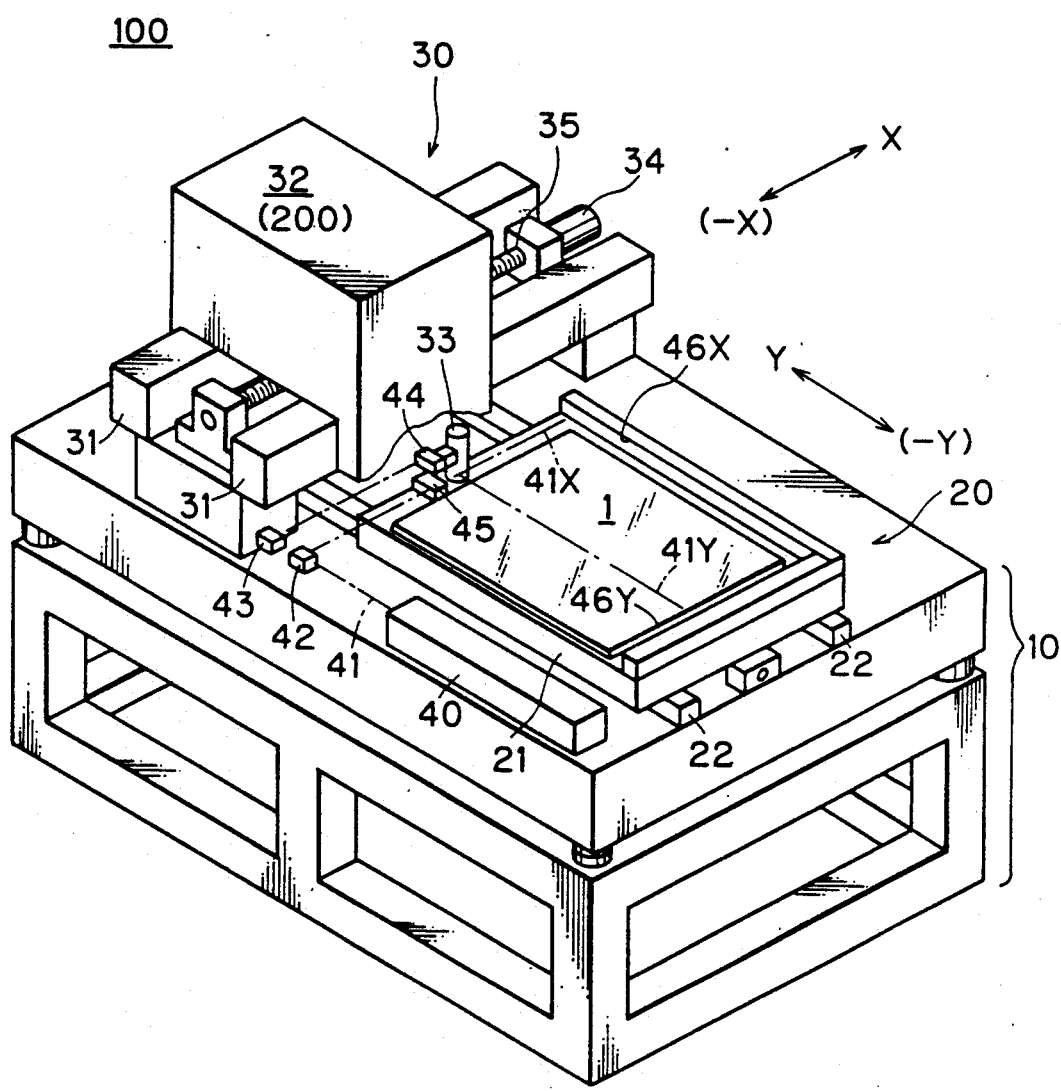
FIG. 5 is a perspective view of an optical beam scanning apparatus according to an embodiment of the present invention.

FIG. 5 is a perspective view of an optical beam scanner 100 employing a beam-to-beam distance adjuster according to an embodiment of the present invention. In FIG. 5, the optical beam scanning apparatus 100 comprises a feed mechanism 20 for feeding a photosensitive material and a drawing mechanism 30, both disposed on a base 10. The feed mechanism 20 includes a suction table 21 onto which a photosensitive material 1 such as dry glass is sucked and mounted.

The suction table 21 is installed for free slide movement on a pair of guide members 22 extending in a horizontal direction Y. Driven by a ball screw driven by a motor (not shown), the suction table 21 reciprocally slides in the directions Y and −Y. Hence, the photosensitive material 1 similarly slides to and fro in the directions Y and −Y.

The drawing mechanism 30 includes a pair of guide members 31 which extend in a horizontal direction X. The direction X is perpendicular to the direction Y. A housing 32 is slidably mounted to the guide members 31. Within the housing 32, an optical scanning system 200 employing a beam-to-beam distance adjuster of the present invention is installed. The optical scanning system 200 will be explained in detail later, together with explanations on the beam-to-beam distance adjuster.

A drawing head 33, illustrated at a notched portion in FIG. 5, is a component of the optical scanning system 200. When the housing 32 slides with rotation of a ball screw 35 driven by a motor 34, the optical scanning system 200 also slides in the direction X or in the direction −X. As a result, the drawing head 33 slides similarly in the directions X or −X.

Also mounted on the base 10 is a Herium-Neon laser oscillator 40. A laser beam 41 from the He-Ne laser oscillator 40 is divided into two laser beams 41X and 41Y through beam splitters 42 to 45. Out of the four beam splitters 42 to 45, the beam splitters 44 and 45 are fixed to the drawing head 33. Plane mirrors 46X and 46Y are provided on end portions of the suction table 21, the mirror 46X being on the end of the direction X and the mirror 46Y being on the end of the direction Y. The laser beams 41X and 41Y hit the mirrors 46X and 46Y and return to the beam splitters 44 and 45, respectively. A light interference detector not shown detects an optical path length between the beam splitter 45 and the mirror 46X and one between the beam splitter 44 and the mirror 46Y, whereby a relative position of the photosensitive material to the drawing head 33 is found.

The feed mechanism 20 is, although not illustrated in FIG. 5, entirely covered with a light shielding hood which can open and close freely.

Figure 6:
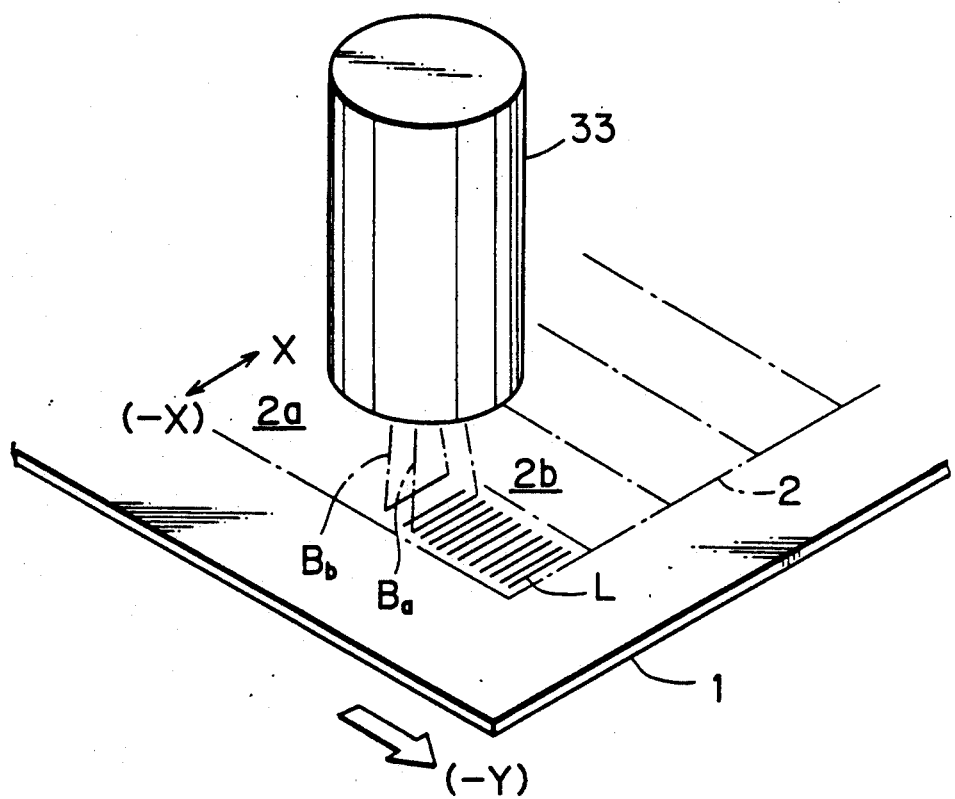

FIG. 6 schematically illustrates a drawing method in the optical beam scanning apparatus 100. The drawing head 33 illuminates the photosensitive material 1 with two laser beams $B_a$ and $B_b$. The beams $B_a$ and $B_b$ are deflected cyclically in the directions X and −X, and are modulated as a function of a predetermined image signal. When the photosensitive material 1 slides in the direction −Y during exposure, the laser beams $B_a$ and $B_b$ scan scanning lines L extending in the directions X and −X, whereby an image is drawn along the scanning lines L.

FIGS. 7A to 7G show relative movement between the photosensitive material 1 and the drawing head 33. The imaginary lines $Y_O$ of FIGS. 7A to 7G trace the position of the drawing head 33 in the X and −X directions. At the beginning, the photosensitive material 1 moves in the Y direction to return the drawing head 33 to a starting position near the lower left edge thereof (FIG. 7A).

Drawing begins and the photosensitive material 1 slides in the direction −Y (FIG. 7B). As the photosensitive material 1 moves, a first strip in the photosensitive material 1 is scanned in the direction Y. When feed of the photosensitive material 1 in the direction −Y has been completed, the drawing head 33 would be as shown in FIG. 7C. Next, the drawing head 33 moves by a predetermined distance $\Delta X$ in the direction X, the predetermined distance $\Delta X$ being equal to an interval between the strips (FIG. 7D).

A second strip is scanned while the photosensitive material 1 is moved in the direction Y (FIG. 7E) until the scan is completely finished (FIG. 7F). Then, the above is repeated and scanning of a drawing area gradually advances (FIG. 7G). Thus, a desired image is recorded in the drawing area.

A-2. Electrical Structures

Figure 8:
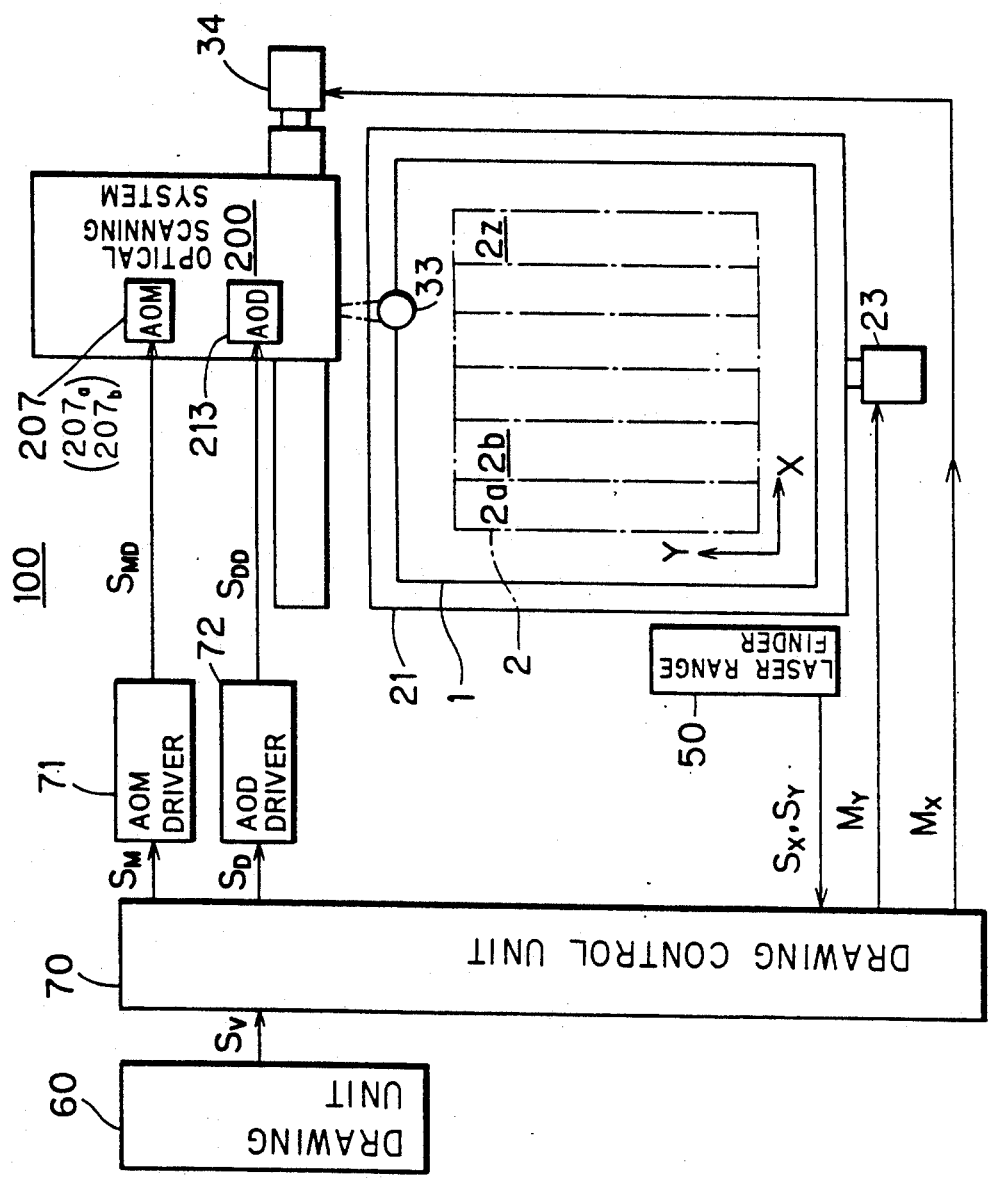
FIG. 8 is a block diagram schematically showing electric structures of the optical beam scanning apparatus.

FIG. 8 is a schematic block diagram showing electrical structures of the optical beam scanning apparatus 100. In FIG. 8, a drawing unit 60 comprising a micro computer and a peripheral equipment generates vector data which represent contour lines of a figure to be drawn. The vector data are divided into divisional vector data $S_V$ corresponding to the respective strips thereafter to be given to a drawing control unit 70.

Receiving the divisional vector data $S_V$, the drawing control unit 70 generates raster data with respect to each scanning line. The generated raster data are then supplied to an AOM driver 71 as an ON/OFF modulation signal $S_M$. The AOM driver 71 converts the modulation signal $S_M$ to an AOM drive signal $S_{MD}$. On the other hand, a deflection signal $S_D$ from the drawing control unit 70 is supplied to an AOD driver 72 to be thereat converted to an AOD drive signal $S_{DD}$. Thus converted signals $S_{MD}$ and $S_{DD}$ are then given to an AOM 207 and an AOD 213 of the optical scanning system 200, respectively. Since the optical scanning system 200 uses two optical beams, the AOM 207 employs two AOMs 207a and 207b (not shown in FIG. 8) and each of the signals $S_M$ and $S_{MD}$ includes two components for the two AOMs.

The drawing control unit 70 gives signals to motors in order to control them, that is, a motor drive signal $M_X$ to the motor 34 which moves the optical scanning system 200 in the directions X and −X and a motor drive signal $M_Y$ to a motor 23 which moves the table 21 in the directions Y and −Y. A laser range finder 50, which detects the position of the photosensitive material 1 by using a laser beam from the laser oscillator 40 of FIG. 5, generates position signals $S_X$ and $S_Y$ which indicate the position of the suction table 21 in the X and Y direction, respectively. The position signals $S_X$ and $S_Y$ are then given to the drawing control unit 70 which generates the modulation signal $S_M$ and the deflection signal $S_D$ in synchronism with the position signals $S_X$ and $S_Y$.

B. Detailed Descriptions on Optical Scanning System 200 employing Beam-to-Beam Distance Adjuster 300

B-1. Generation and Modulation of Laser

Figure 9:
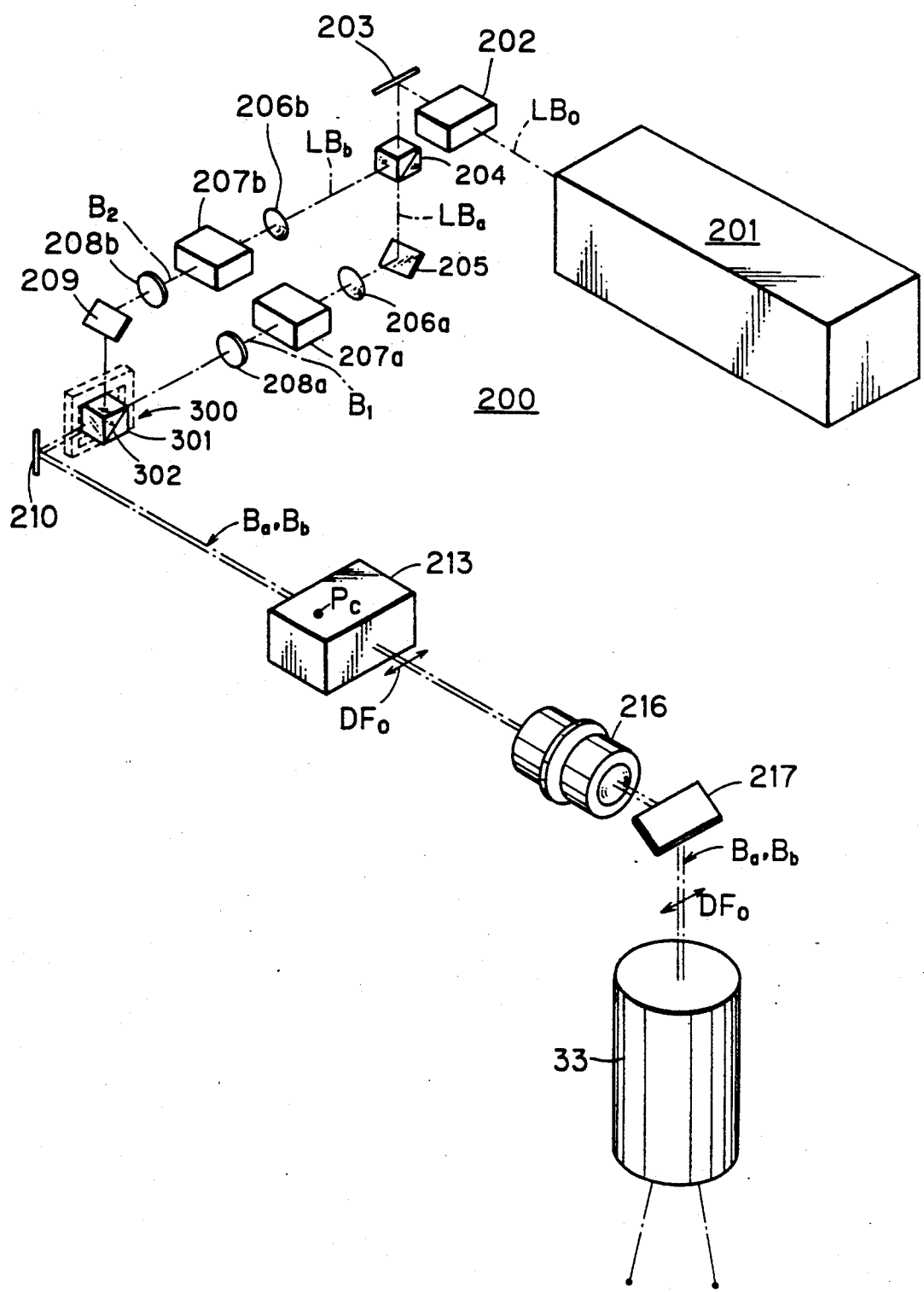
FIG. 9 is a block diagram of an optical scanning system in which a beam-to-beam distance adjuster is employed.

FIG. 9 is a perspective view in diagrammatic form of the optical scanning system 200. An Ar+ laser oscillator 201 emits a laser beam $LB_O$, which impinges upon an AOM 202. The AOM 202 corrects intensity of the laser beam to attain the best exposure condition when a diameter of a beam spot on the photosensitive material 1 is changed. The laser beam $LB_O$ passing through the AOM 202 strikes a mirror 203. Reflected by the mirror 203, the laser beam $LB_O$ enters a beam splitter 204 where it is divided into two laser beams $LB_a$ and $LB_b$. Out of the two laser beams $LB_a$ and $LB_b$, the first laser beam $LB_a$ is reflected by a mirror 205, and is then guided to an AOM 207a via a focusing lens 206a. In the AOM 207a, the first laser beam $LB_a$ is modulated and on-off controlled according to a first component of the AOM drive signal $S_{MD}$ (FIG. 8). A modulated laser beam $B_1$ from the AOM 207a enters the beam-to-beam distance adjuster 300 through a collimater 208a.

The another laser beams $LB_b$ from the beam splitter 204 enters an AOM 207b via a focusing lens 206b. The AOM 207b modulates and on-off controls the laser beam $LB_b$ according to a second component of the AOM drive signal $S_{MD}$. A modulated laser beam $B_2$, which is turned on and off by the AOM 207b, enters a collimator 208b to be given via a mirror 209 to the beam-to-beam distance adjuster 300 as a collimated beam. In entering the beam-to-beam distance adjuster 300, the two laser beams $B_1$ and $B_2$ are at right angles.

Although the present embodiment has described that a single laser beam is divided to obtain such two modulated beams as above, this has no limiting sense. Instead, the two modulated beams can be generated by other conventional methods, for example, by using two separate laser sources including semiconductor lasers. If semiconductor lasers are used, a modulating means may not be always necessary because semiconductor lasers turn on and off laser beams.

B-2. Structures of Beam-to-Beam Distance Adjuster 300

Figure 10:
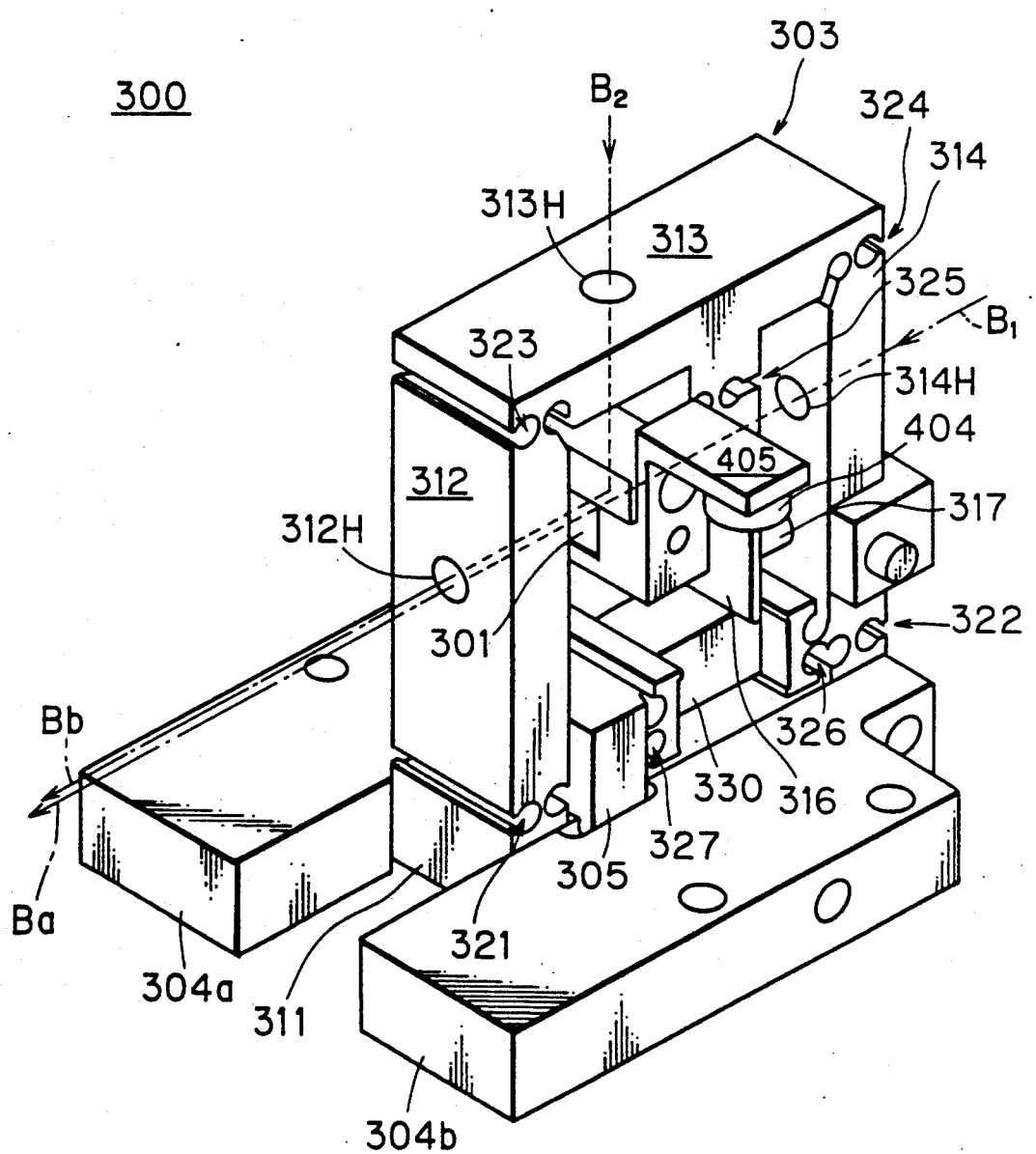
FIG. 10 is a perspective view of the beam-to-beam distance adjuster.
Figure 11:
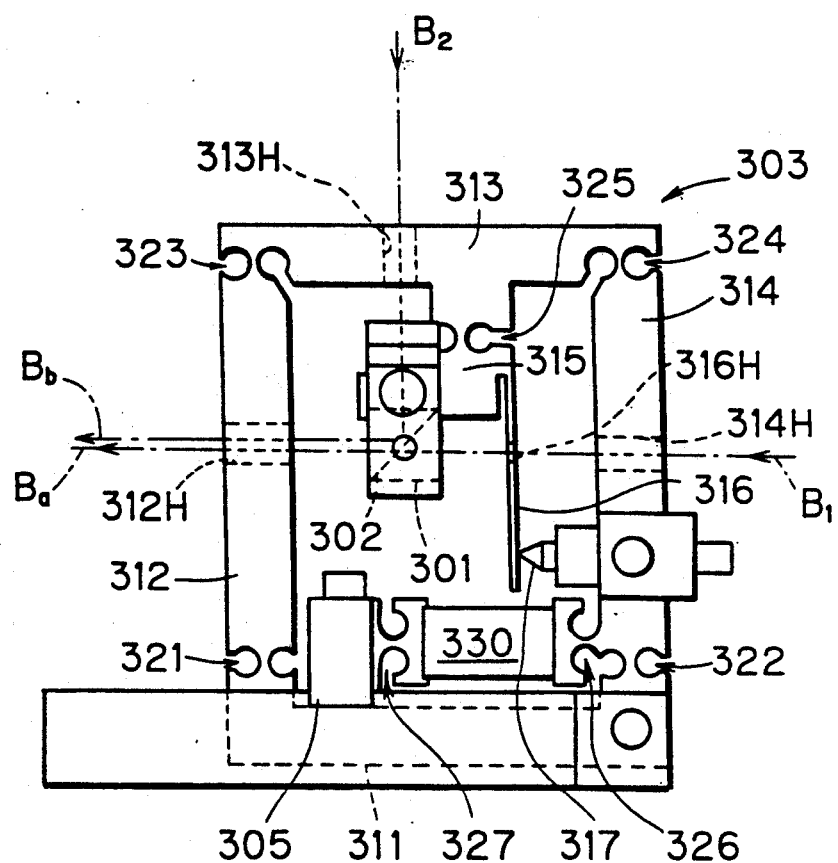
FIG. 11 is a cross sectional view of the beam-to-beam distance adjuster.

FIG. 10 is a perspective view and FIG. 11 is a cross sectional view of the beam-to-beam distance adjuster 300. In FIGS. 10 and 11, the beam-to-beam distance adjuster 300 comprises a beam director 301 and a notched link mechanism 303 for rotationally displacing the element 301. The notched link mechanism 303 is cut from a block of elastic material such as a metal block. The element 301 is linked to the notched link mechanism 303. The portions 311 to 314 of the notched link mechanism 303 are arm members forming a rectangular shape. The arm member 311 is firmly held between blocks 304a and 304b, which in turn firmly holds the whole body of the notched link mechanism 303.

The arm members 312 and 314 extend upwardly from the arm member 311 through notch portions 321 and 322, respectively. The arm member 313 extending in a horizontal direction bridges the arm members 312 and 314 by notch portions 323 and 324 which are at the top ends of the arm members 312 and 314.

From an approximately center portion of the arm member 313, there downwardly extends another arm member 315. The arm member 315 is linked to the arm member 313 through a notch portion 325. Further from the arm member 315, a plate spring 316 extends downwardly so that the free end portion of the plate spring 316 contacts with a horizontally extending projection 317. The beam director 301 is fixed to the arm member 315. In thus constructed beam-to-beam distance adjuster 300, optical beams entering the same would advance as follows: The first beam $B_1$ from the right side of FIG. 11 enters through holes 314H and 316H provided respectively in the arm member 314 and the plate spring 316. The beam $B_1$ then enters the element 301 where it strikes the half mirror surface 302. Out of optical components of the first beam $B_1$, only those transmitted by the half mirror surface 302 advances to a through hole 312H to leave the beam-to-beam distance adjuster 300 as the beam $B_a$. On the other hand, the second beam $B_2$ entering the beam-to-beam distance adjuster 300 from up above enters a through hole 313H provided in the arm member 313 to hit the half mirror surface 302. Out of optical components of the second beam $B_2$, only those reflected by the half mirror surface 302 advances to the through hole 312H to become the beam $B_b$.

A piezoelectric element 330 is linked at its end to a lower portion of the arm member 314 through a notch portion 326. Another end of the piezoelectric element 330 is linked through a notch portion 327 to a support member 305 which is mounted to arm member 311.

The beam-to-beam distance adjuster 300 also includes a rotation angle control unit 400 for controlling a rotation angle of the element 301. The rotation angle control unit 400 will be explained in detail later. Before that, operations of the beam-to-beam distance adjuster 300 will be explained.

B-3. Operations of Beam-to-Beam Distance Adjuster 300

Figure 12:
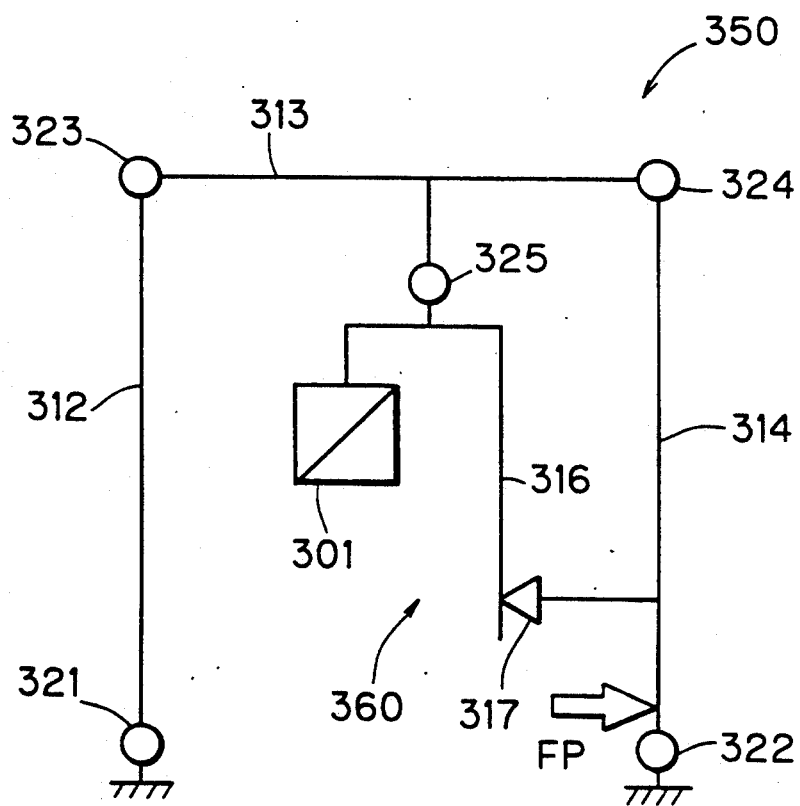
FIG. 12 is a block diagram showing mechanism of the beam-to-beam distance adjuster.

FIG. 12 shows mechanism of the beam-to-beam distance adjuster 300 in a diagrammatic form. The beam-to-beam distance adjuster 300 includes a parallel movement mechanism 350 and a rotational movement mechanism 360. The parallel movement mechanism 350 is for moving the beam director 301 in a parallel direction while the rotational movement mechanism 360 is for rotating the beam director 301.

Parallel Movement Mechanism 350

Figure 13:
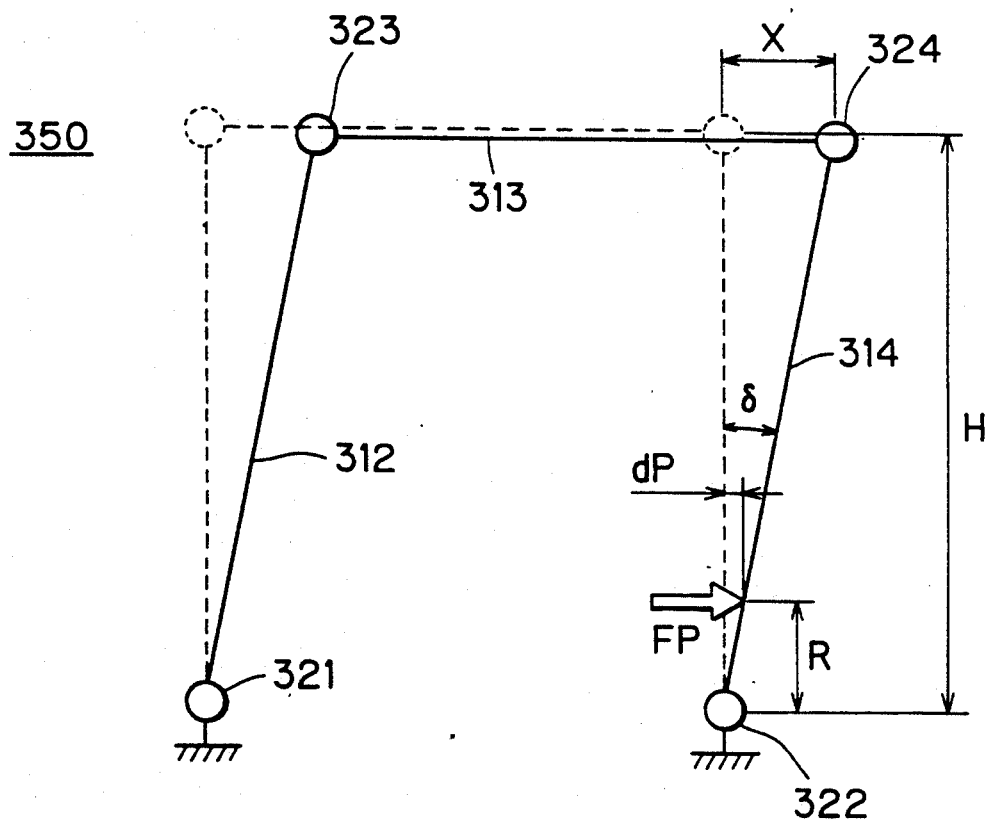
FIG. 13 a block diagram showing structures and mechanism of a parallel movement mechanism.

First, the parallel movement mechanism 350 will be explained. FIG. 13 a block diagram showing mechanism of the parallel movement mechanism 350. As in FIG. 13, the notch portions 321 to 324 serve as linking nodes and the members 312 to 314 serve as arms of the parallel movement mechanism 350. When the piezoelectric element 330 extends by a length dP to give force FP to the arm member 314, inclination of the parallel movement mechanism 350 occurs, whereby the beam director 301 (not shown in FIG. 13) is moved a predetermined distance x in a parallel direction. In such inclination, if an inclination angle $\delta$ of the arm member 314 is small, the distance x and extension dP are $$x = M_L \cdot dP = \frac{H}{R} dP \quad (15)$$

where
$M_L$ ... lever ratio;
H ... a length of the arm member 314; and
R ... a distance between the notch portion 322 and an action point of the force FP.

Rotational Movement Mechanism 360

Figure 14A:
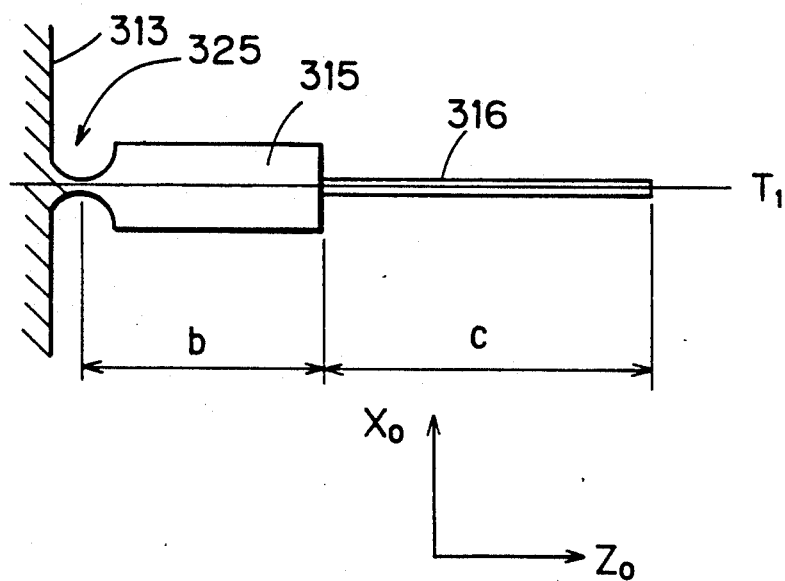
FIGS. 14A and 14B are explanatory diagrams illustrating operations of a rotational movement mechanism.
Figure 14B:
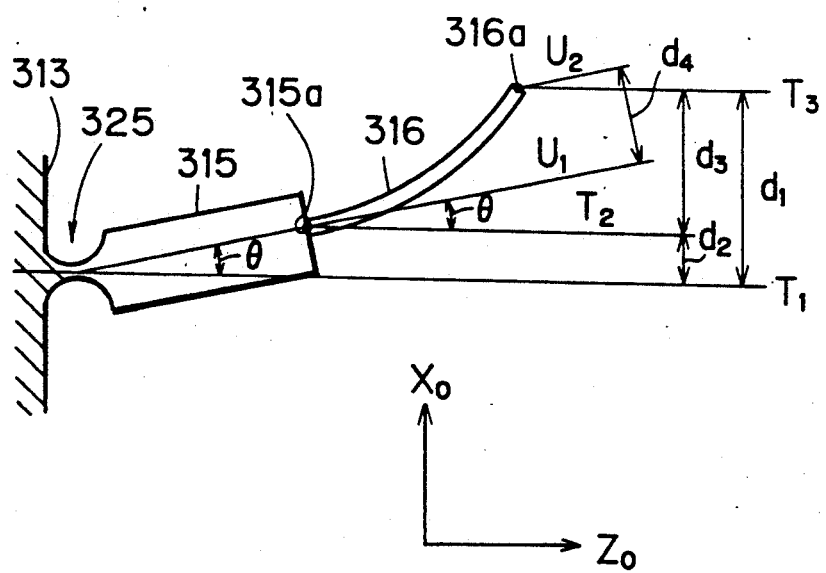

For easy understandings, a mechanism as shown in FIGS. 14A and 14B is explained prior to detailed descriptions on the rotational movement mechanism 360.

FIG. 14A shows the arm member 313 and the arm member 315 extending therefrom through the notch portion 325 in a direction $Z_0$. From the arm member 315, the plate spring 316 further extends in the same $Z_0$ direction. If force F of a direction $X_0$ which is perpendicular to the direction $Z_0$ acts on the plate spring 316, the arm member 315 will incline around the notch portion 325 at an angle of $\theta$ while the plate spring 316 will be deflected (FIG. 14B). In FIGS. 14A and 14B, the symbols stand for:

$T_1$ ... a line extending in the $Z_0$ direction through the notch portion 325;

$T_2$ ... a line extending in the $Z_0$ direction through a point 315a which is on the end of the arm member 315;

$T_3$ ... a line extending in the $Z_0$ direction through a point 316a which is on the free end of the plate spring 316;

$U_1$ ... a line drawn from the notch portion 325 to make an angle of $\theta$ to the line $T_1$;

$U_2$ ... a line drawn from the point 316a to be parallel to the line $U_1$;

b ... a length of the arm member 315;
c ... a length of the plate spring 316;
$d_1$ ... a distance between the line $T_1$ and the line $T_3$;
$d_2$ ... a distance between the line $T_1$ and the line $T_2$;
$d_3$ ... a distance between the line $T_2$ and the line $T_3$; and
$d_4$ ... a distance between the line $U_1$ and the line $U_2$.

In a state as shown in FIG. 14B, the mechanism satisfies $$d_1 = d_2 + d_3 \quad (16)$$
$$= b \cdot \sin\theta + c \cdot \sin\theta + d_4 \cdot \cos\theta$$

and then $$d_4 = \frac{d_1 - b \cdot \sin\theta - c \cdot \sin\theta}{\cos\theta} \quad (17)$$

At the same time, the force F acting on the free end portion of the plate spring 316 and the distance $d_4$ have the following relation:

$$F = k_2 \cdot d_4 \quad (18)$$

where $k_2$ is a deflection coefficient of the plate spring 316. Then, eliminating $d_4$ from Eqs. 17 and 18 gives $$F = \frac{k_2(d_1 - b \cdot \sin\theta - c \cdot \sin\theta)}{\cos\theta} \quad (19)$$

On the other hand, Eq. 20 below gives a moment M at the notch portion 325 as $$M = k_1 \cdot \theta \quad (20)$$
$$= F(b + c)$$

where $k_1$ is a spring coefficient of the notch portion 325 which functions as a fulcrum of elasticity at which the rotation angle and the imposed moment are in proportional relation. Solving Eq. 20 for $\theta$, $$\theta = \frac{F}{k_1}(b+c) \tag{21}$$

and eliminating F from Eqs. 19 and 21, $$\theta = \frac{k_2(d_1 - n \cdot \sin\theta)n}{k_1 \cdot \cos\theta} \tag{22}$$

where n=b+c. Since the two relations $\sin\theta \approx \theta$ and $\cos\theta \approx 1$ hold when the angle $\theta$ is small, Eq. 22 becomes $$\theta = \frac{k_2}{k_1}(d_1 - n \cdot \theta)n \tag{23}$$
$$= m(d_1 - n \cdot \theta)n$$

where $m = k_2/k_1$. Hence, the angle $\theta$ is found by rewriting Eq. 23.

$$\theta = \frac{m \cdot n}{1 + m \cdot n} d_1 \tag{24}$$

Figure 15:
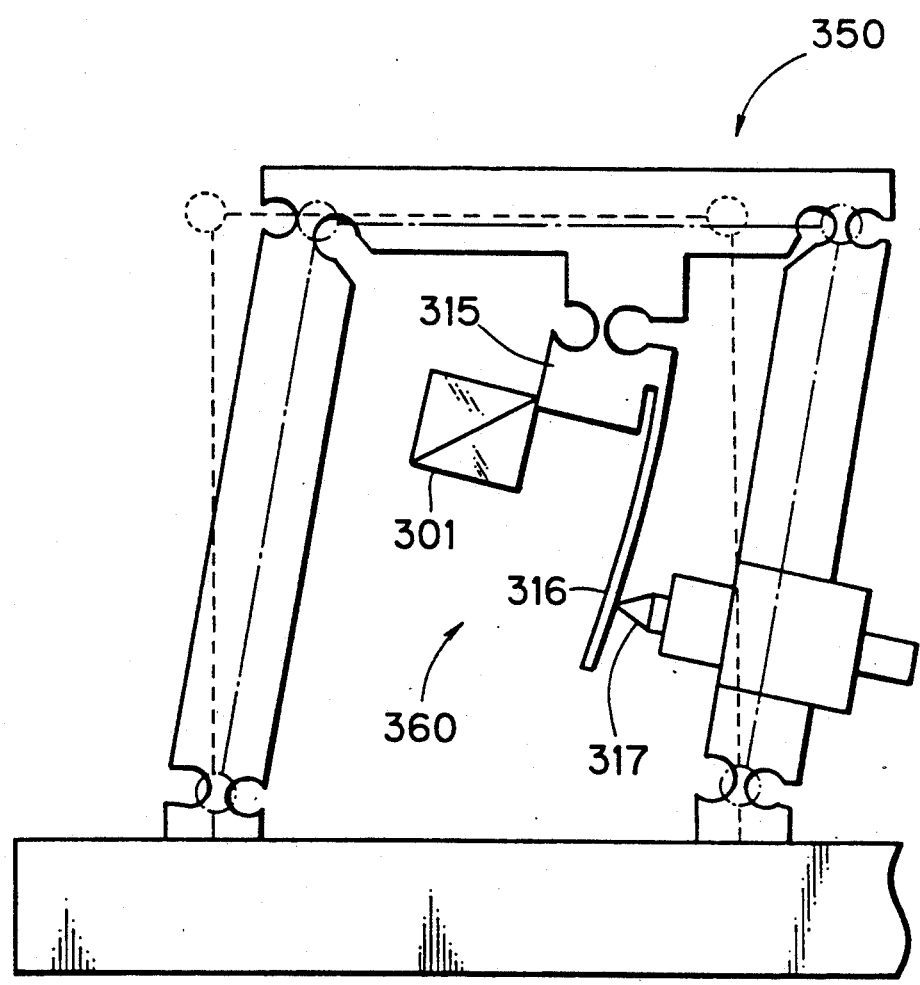
FIG. 15 shows a state in which the parallel movement mechanism and the rotational movement mechanism would be when a beam director is displaced in a parallel and rotational manner.
Figure 16:
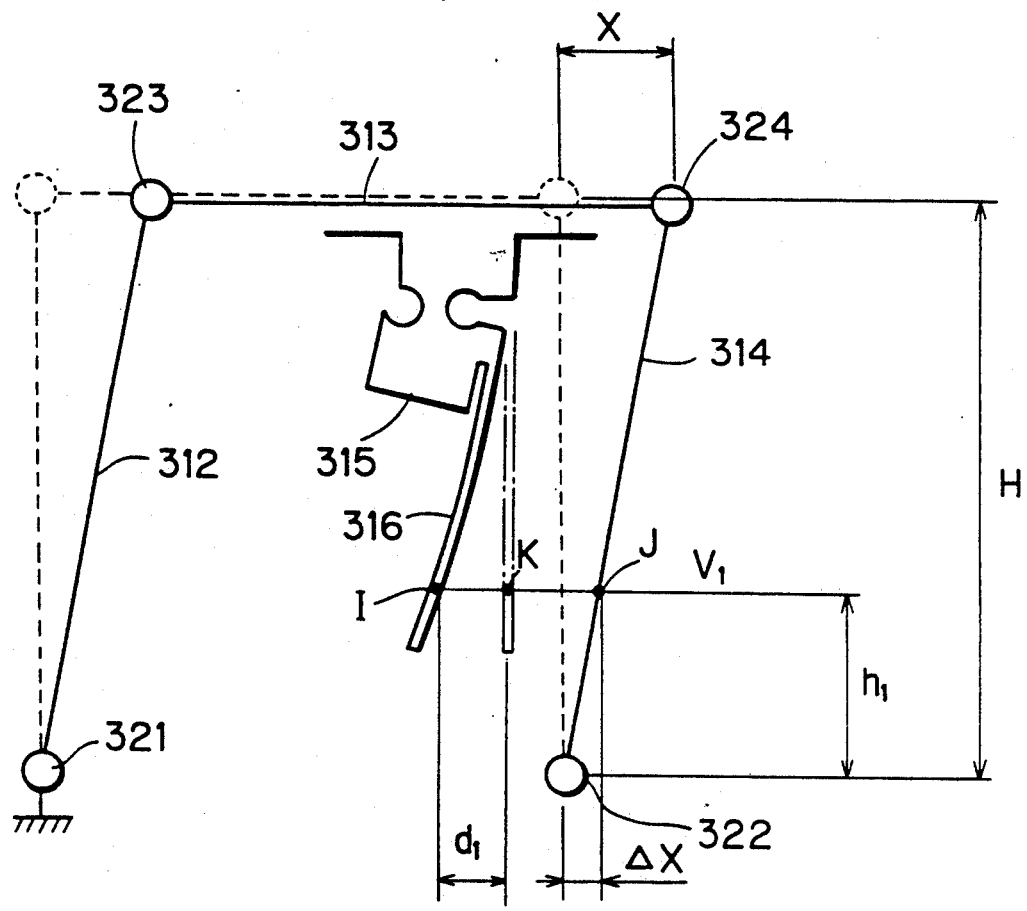
FIG. 16 shows analysis of operations of the parallel movement mechanism and the rotational movement mechanism.

Next, explanations will be given on how the rotational movement mechanism 360 would operate when the parallel movement mechanism 350 operates. FIG. 15 shows operations of the rotational movement mechanism 360, and FIG. 16 shows analysis of such operations. In FIG. 16, the piezoelectronic element 330 has extended itself by a length dP, so that the parallel movement mechanism 350 has moved the beam director 301 in a parallel direction by a distance x. Definitions of the symbols in FIG. 16 are as given below.

I ... a contact point of the projection 317 and the plate spring 316;

$V_1$ ... a line drawn from the point I in a horizontal direction $X_1$;

J ... an intersection of the line $V_1$ and the arm member 314;

K ... an imaginary intersection of the line $V_1$ and the plate (shown by a dotted-dashed line) 316 on the assumption that parallel movement has taken place where the projection 317 does not exist;

$h_1$ ... a distance between the notch portion 322 and the point I taken in a vertical direction $Z_1$, which is perpendicular to the direction $X_1$; and $\Delta x$ ... a distance between the notch portion 322 and the point J taken in the horizontal direction $X_1$.

As shown in FIG. 16, the following relation holds:

$$x:H = \Delta x:h_1$$

Hence, $$\Delta x = x \cdot h_1 / H \tag{25}$$

At the same time, the distances x, $\Delta x$ and $d_1$ are $$x = \Delta x + d_1 \tag{26}$$

From Eqs. 25 and 26, it follows that $$d_1 = x - (h_1/H)x \tag{27}$$
$$= (1 - h_1/H)x$$

Eliminating $d_1$ from Eqs. 24 and 27, $$x = \frac{H(1 + m \cdot n^2)}{(H - h_1)m \cdot n} \theta \tag{28}$$

This immediately suggests that the beam director 301 can be rotationally displaced while never failing to satisfy Eq. 7 in the notched link mechanism 303 which is designed so as to satisfy Eq. 29 given below.

$$2a = \frac{H(1 + m \cdot n^2)}{(H - h_1)m \cdot n} \tag{29}$$

Needless to say, if it is possible to rotationally displace the beam director 301 while always satisfying Eq. 7, wide adjustment of a beam-to-beam distance is obtainable. In addition, since only one actuator (piezoelectric element) is needed, the beam-to-beam distance adjuster 300 can be of simple structures which in turn would enable simple and easy control therefor.

Rotation Angle Control Unit 400

Figure 17:
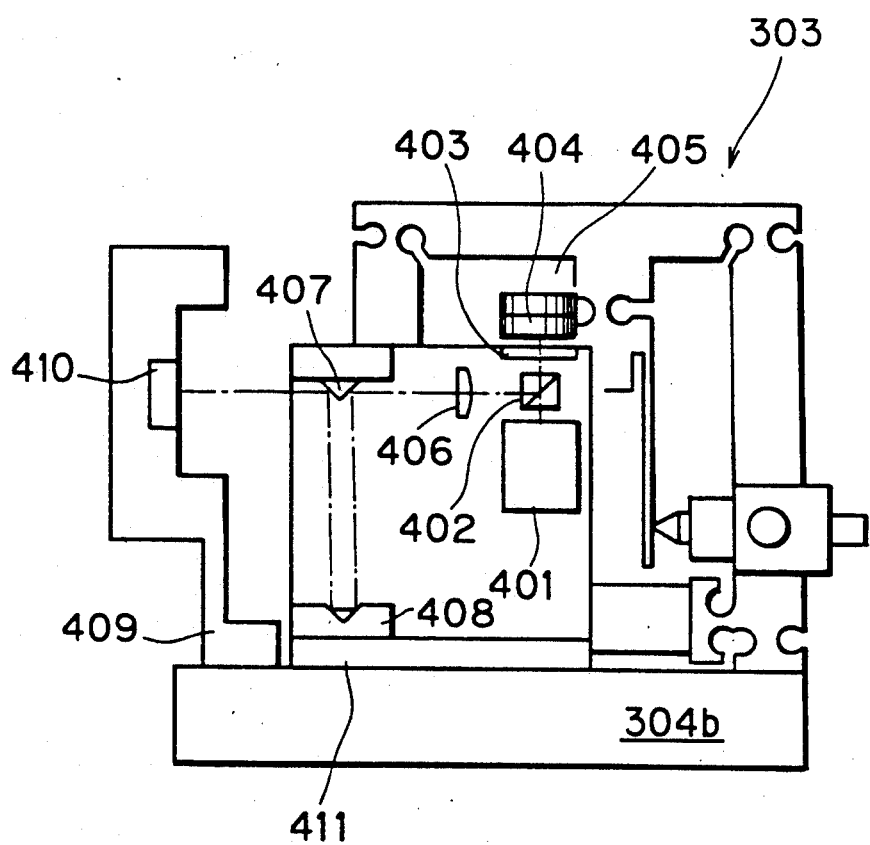
FIG. 17 is a plane view of a rotation angle control unit.

Now, explanations will be given on the rotation angle control unit 400 for controlling the rotation angle $\theta$ of the beam director 301. Figures correspond to the explanations are FIGS. 17 and 18. The rotation angle control unit 400 comprises a semiconductor laser oscillator 401, a deflection type beam splitter 402 and a quarter-wave plate 403 (FIG. 18), each mounted to an L-shaped in section support member 411 which is secured to a base block 304b (FIG. 17). The laser beam oscillator 401 emits a laser beam $L_S$ (FIG. 18) which would impinge upon a mirror 404 through the deflection type beam splitter 402 and the quarter-wave plate 403. The mirror 404 is mounted to a support member 405 (FIG. 10) which is afixed to the arm member 315, and therefore, would make angle-$\theta$-rotation with rotation of the beam director 301. At the mirror 404, the laser beam $L_S$ is downwardly reflected back to the quarter-wave plate 403, and thence to the deflection type beam splitter 402. Since the laser beam $L_S$ in its second entrance to the beam splitter 402 has plane of polarization shifted 90 degrees, the beam splitter 402 would direct the laser beam $L_S$ to a lens 406 which would in turn guide it to a prism 407, and further to another prism 408. The laser beam $L_S$ thus guided to be reflected by the prisms finally enters a position sensing device, or a PSD 410 fixed to a support member 409 which is secured to a holder 304a. With the structures as above, the rotation angle control unit 400 detects the rotation angle $\theta$ of the beam director 301. Precisely, when the beam director 301 driven by the piezoelectric element 330 rotates, the rotation angle $\theta$ would be detected as a positional deviation of a laser spot on the PSD 410.

Figure 18:
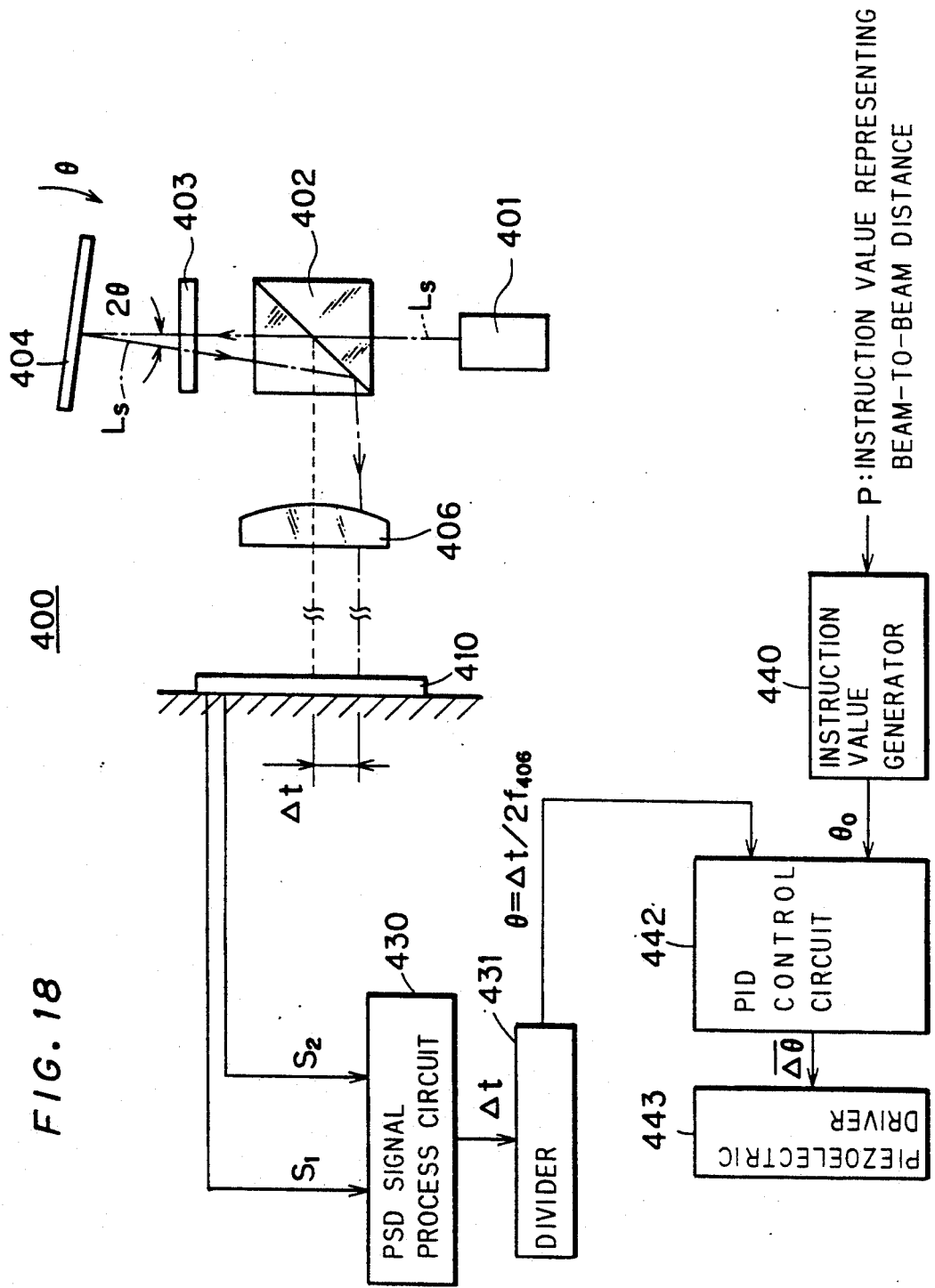
FIG. 18 is a block diagram showing flow of control procedures the rotation angle control unit performs.

FIG. 18 is a block diagram showing control procedures of the rotation angle control unit 400. First, an instruction value generator 440 receives an instruction value P representing a desired beam-to-beam distance. Then, the instruction value generator 440 calculates the rotation angle $\theta_0$ of the beam director 301 according to the instruction value P.

The PSD 410 releases, from its a pair of electrodes, a pair of detection signals $S_1$ and $S_2$. The detection signals $S_1$ and $S_2$ would be given to a PSD signal process circuit 430 of a conventional design. The PSD signal process circuit 430 calculates a variation $\Delta t$ of a laser spot on the detection plane of the PSD 410 on the basis of the detection signals $S_1$ and $S_2$. The laser spot variation $\Delta t$ is in the following relation with the rotation angle $\theta$:

$$\Delta t \approx 2\theta \cdot f_{406}$$

where $f_{406}$ is a focal length of the lens 406. Rewriting the relation gives $$\theta = \Delta t / 2 f_{406}$$

A divider 431 divides the laser spot variation $\Delta t$ by $2f_{406}$ to find an actual rotation angle $\theta$ of the beam director 301. The reason the divider 431 uses a coefficient "2" is because a deflection angle of the laser beam $L_S$ is equal to an angle twice the rotation angle $\theta$ of the beam director (FIG. 18).

Thus found actual rotation angle $\theta$ and an instruction angle $\theta_0$ are both given to a PID control circuit 442. The PID control circuit 442 generates a comparison signal, an integration signal and a differentiation signal of a deviation $(\theta_0 - \theta)$ between the two signals, and outputs a PID control signal $\overline{\Delta\theta}$ to a piezoelectric driver 443, the PID control signal $\overline{\Delta\theta}$ being a combination of the comparison, the integration and the differentiation signals. Receiving the PID control signal $\overline{\Delta\theta}$, the piezoelectric driver 443 generates a piezoelectric element driving signal which would make the piezoelectric element 330 to extend or shrink itself a length which corresponds to the deviation $(\theta_0 - \theta)$.

Through such closed loop control as above, the rotation angle $\theta$ of the beam director 301 would coincide with the instruction angle $\theta_0$. Still, an open loop control may be of course used instead in controlling the rotation angle of the beam director 301.

B-4. Deflection of Beams $B_a$ and $B_b$

Figure 1:
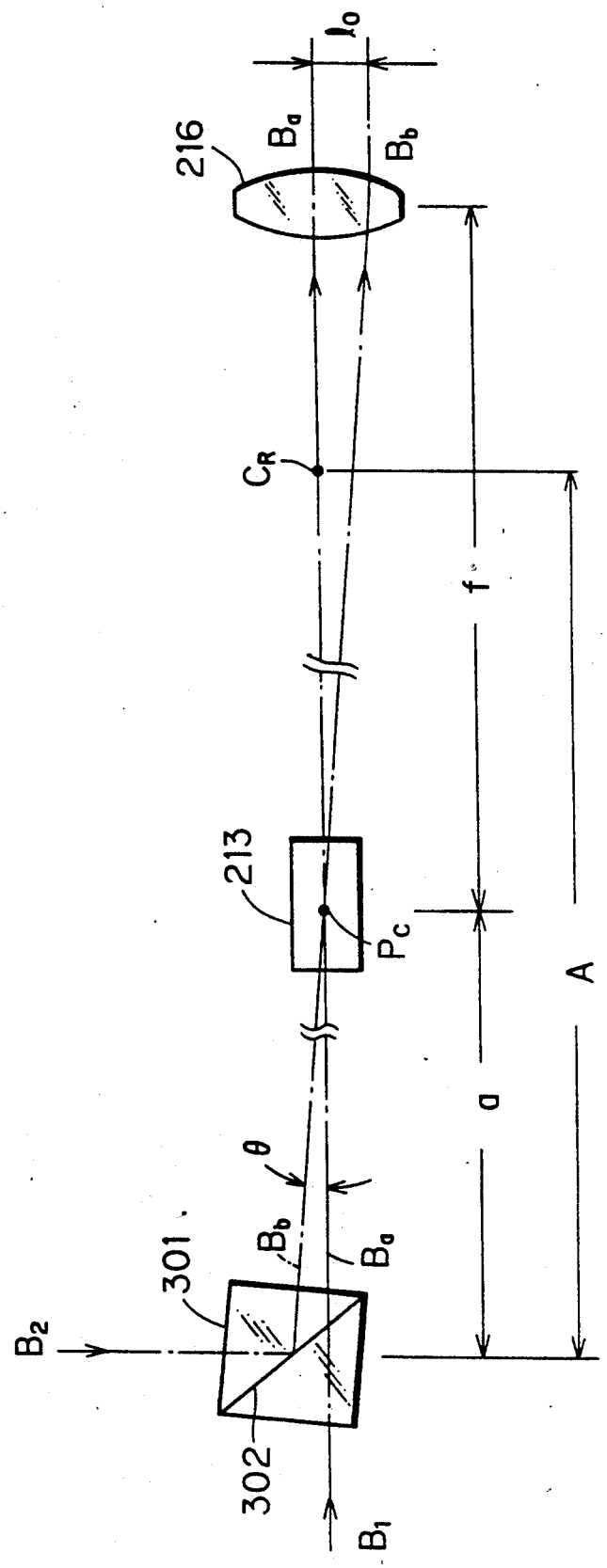
FIGS. 1 and 2 illustrate a method of changing an intersection angle of optical beams by means of a beam director.
Figure 2:
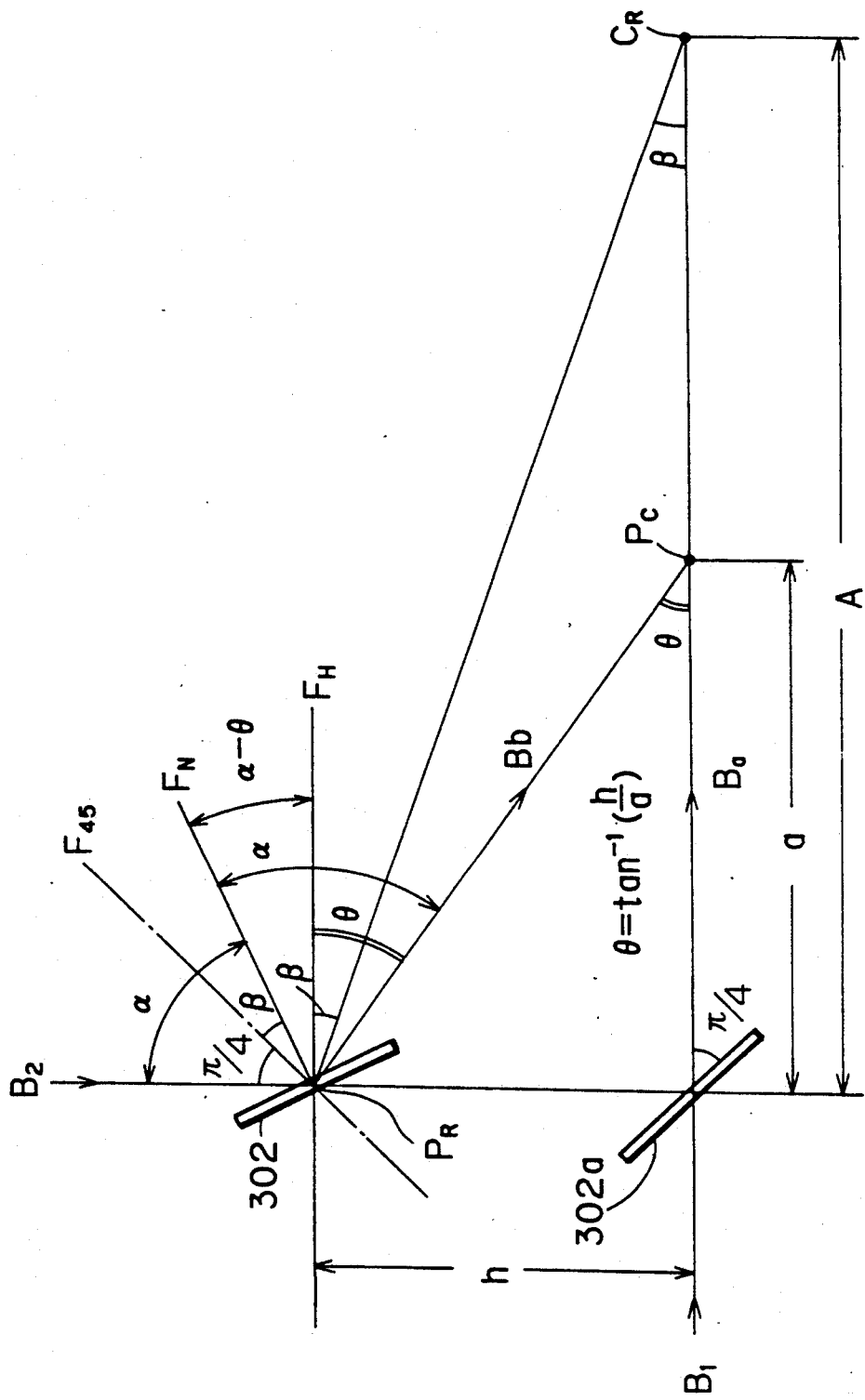
Figure 3:
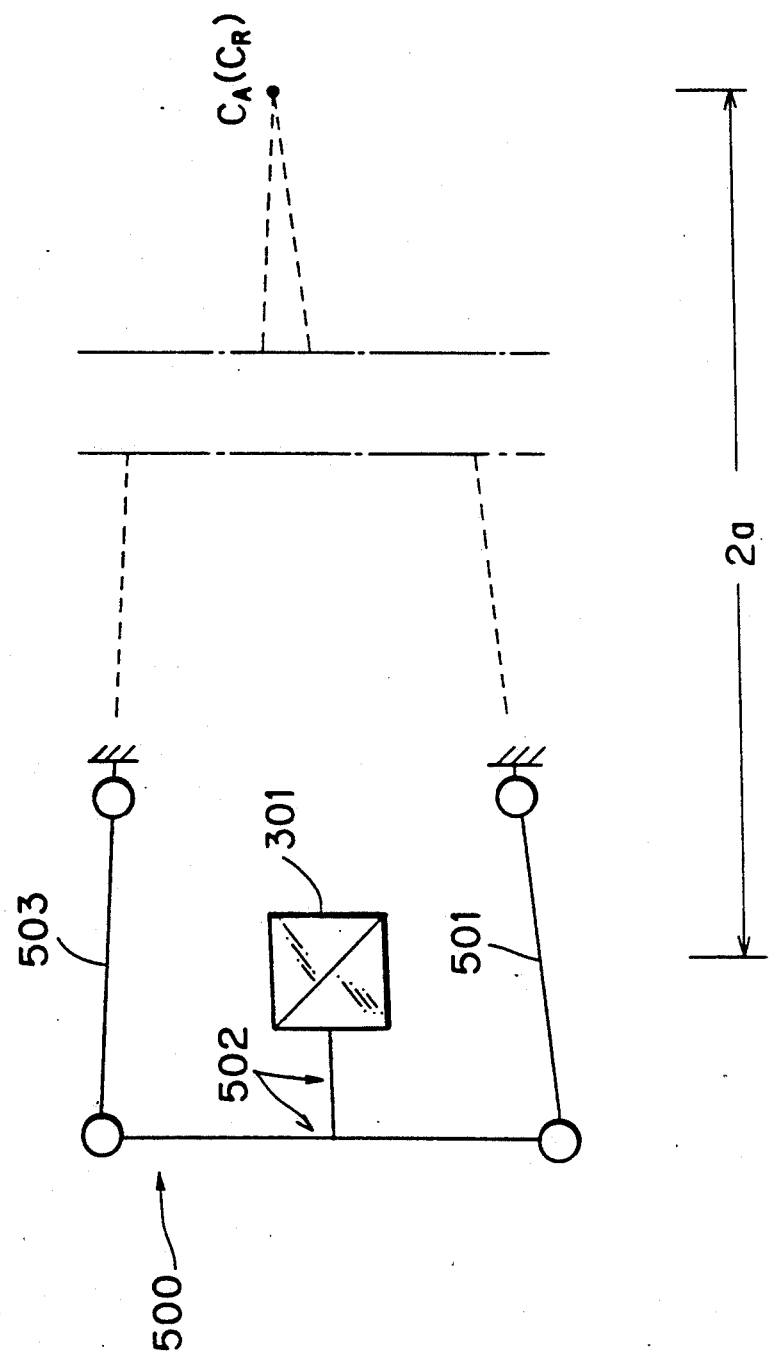
FIGS. 3 and 4 are block diagrams of a beam-to-beam distance adjuster of conventional design.
Figure 4:
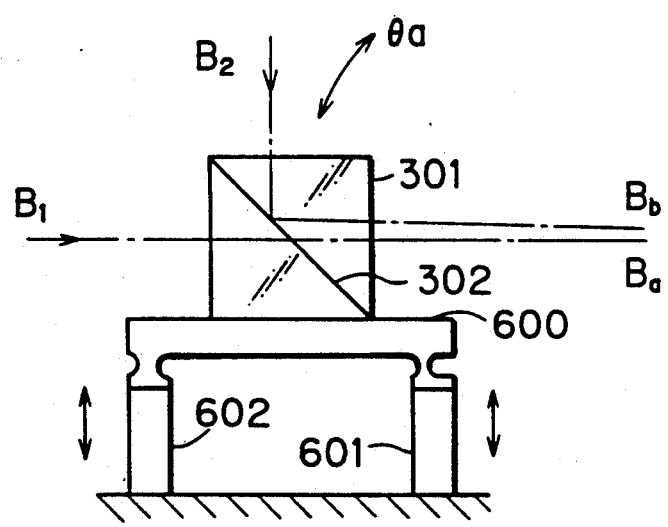

Now, descriptions with reference to FIG. 9 will resume. The laser beams $B_a$ and $B_b$ thus generated by the beam-to-beam distance adjuster 300 would strike a mirror 210 to be reflected to enter the AOD 213 in which they would intersect at a point $P_C$. For clarity, FIG. 9 does not show how the laser beams $B_a$ and $B_b$ intersect. Also in FIG. 9, a distance a defined in FIG. 1 corresponds to an optical path length between the element 301 and the AOD 213. FIG. 9 does not show the rotation center $C_R$ of FIG. 1, either. If illustrated in FIG. 9, the rotation center $C_R$ would be seen on a line drawn by extending a line drawn from the beam director 301 to the mirror 210.

The AOD 213 cyclically deflects the two laser beams $B_a$ and $B_b$ in a deflection direction $DF_O$. The deflected laser beams $B_a$ and $B_b$ enters the scanning lens 216 where they would be collimated to become parallel beams distanced away from each other correspondingly to the intersection angle $\theta$. The laser beams $B_a$ and $B_b$, now parallel beams, strikes a mirror 217 at which they would be reflected to be guided into the drawing head 33.

The diameter of the laser beams $B_a$ and $B_b$ thus generated in the beam-to-beam distance adjuster 300 can be changed by a beam expander customarily used in the art.

B-5. Drawing Head 33

The drawing head 33 comprises a deflection direction adjuster (not shown). The deflection direction adjuster properly adjusts the direction of deflection $DF_O$ of the laser beams $B_a$ and $B_b$. The drawing head 33 also includes an objective lens (not shown) with a magnification by which optical beams would be reduced at a predetermined reduction ratio. The laser beams $B_a$ and $B_b$ reduced by the objective lens would impinge on the photosensitive material 1.

C. Modification

C-1. With Three or More Laser Beams

Figure 19:
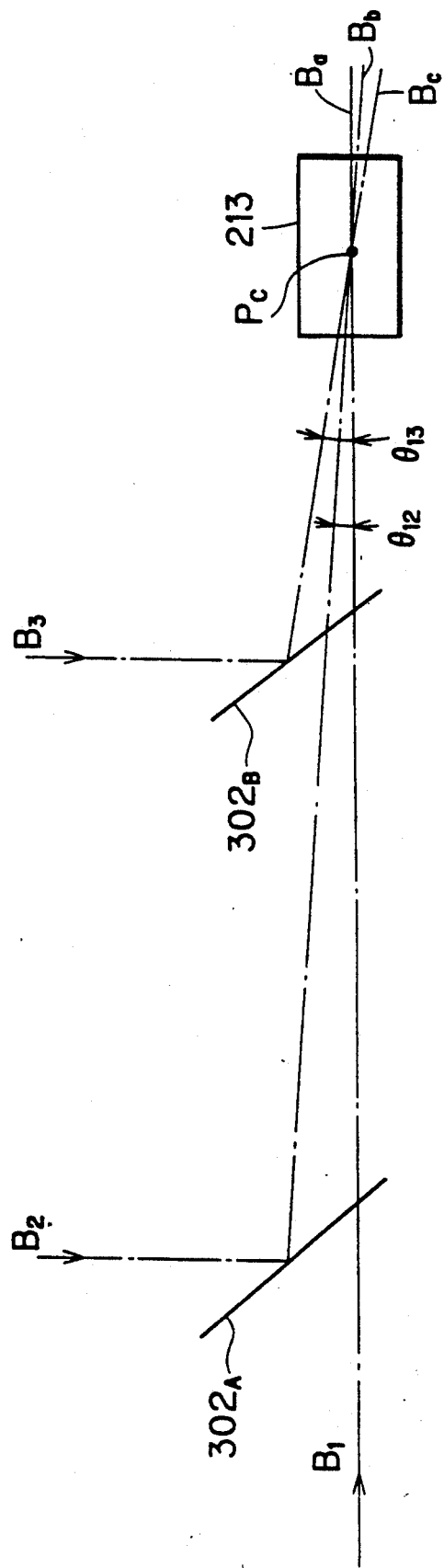
FIG. 19 illustrates a method of chaning an intersection angle of three optical beams.

The present invention is applicable to an optical beam scanning apparatus in which more than two laser beams are used for image drawing. FIG. 19 illustrates a method of converting three beams $B_1$ to $B_3$ into intersecting beams $B_a$ to $B_c$. For such conversion, a beam-to-beam distance adjuster comprises two beam directors (not shown), one for changing the direction of the laser beam $B_1$ by means of its half mirror $302_A$ and another for changing the direction of the laser beam $B_2$ by means of its half mirror $302_B$. The half mirrors $302_A$ and $302_B$ are each rotationally displaced by two movement mechanisms constructed similarly to those included in the beam-to-beam distance adjuster 300 shown in FIG. 10. The movement mechanisms, however, are differently distanced from the rotation center since the half mirrors $302_A$ and $302_B$ are differently distanced from an intersection $P_C$. Owing to different distances from the intersection $P_C$, it is possible to change at will an intersection angle $\theta_{12}$ between the laser beams $B_1$ and $B_2$ as well as an intersection angle $\theta_{13}$ between the laser beams $B_2$ and $B_3$.

C-2. Modification of Beam-to-Beam Distance Adjuster 300

In the beam-to-beam distance adjuster 300, the plate spring 316 contacts with the projection 317 at its free end portion. However, the end portion in contact with the projection 317 may be fixed. In addition, the plate spring 316 itself may be substituted by a metal piece with a notch which functions as a fulcrum of elasticity.

In such a modification, however, the analysis heretofore described cannot be directly applied. What changes are needed will be now described while referring to FIGS. 20A and 20B.

Figure 20:
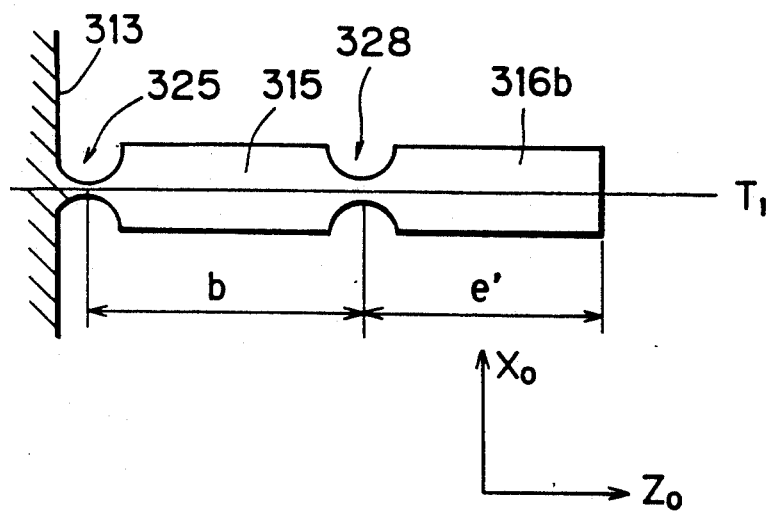
FIGS. 20A and 20B are explanatory diagrams showing a modification of the beam-to-beam distance adjuster.
Figure 20:
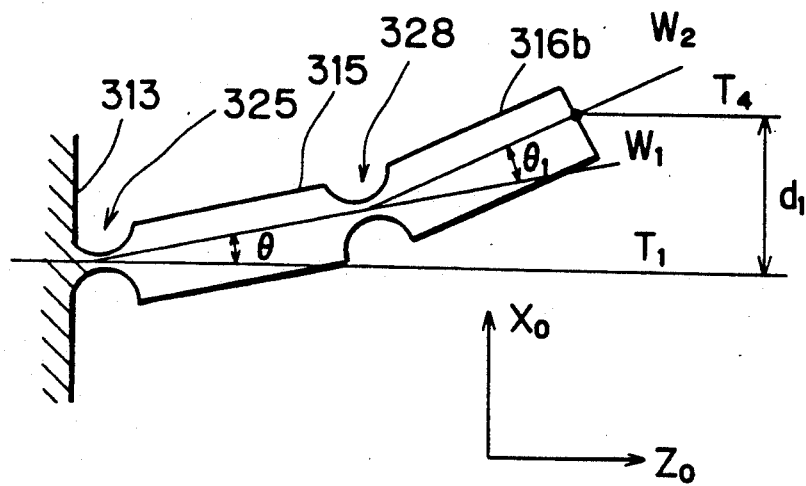

In FIG. 20A, an arm member 315 extends from an arm member 313 in a direction $Z_0$ through a notch portion 325. Another arm member 316b extends from the arm member 315 also in the direction $Z_0$ through a notch portion 328. The whole mechanism will make inclination as shown in FIG. 20B if force F of a direction $X_0$ which is perpendicular to the direction $Z_0$ is given to the free end portion of the arm member 316b. More precisely, the arm member 315 inclines about the notch portion 325 at an angle of $\theta$ while the arm member 316b inclines about the notch portion 328 at an angle of $\theta_1$. In FIGS. 20A and 20B, the lines and the symbols are defined as follows.

$T_4$ ... a line extending in the $Z_0$ direction to penetrate the free end of the arm member 316b;

$W_1$ ... a line drawn from the notch portion 325 at an angle of $\theta$ to the line $T_1$;

$W_2$ ... a line drawn from the notch portion 328 at an angle of $\theta_1$ to the line $W_1$;

e ... a length of the arm member 316b; and $d_1$ ... a distance between the line $T_1$ and the line $T_4$.

In a state as shown in FIG. 20B, the mechanism satisfies $$d_1 = b \cdot \sin\theta + e \cdot \sin(\theta + \theta_1) \tag{29}$$

If the angles $\theta$ and $\theta_1$ take small values, the four relations approximately hold.

$$\sin\theta \simeq \theta, \quad \sin\theta_1 \simeq \theta_1$$
$$\cos\theta \simeq 1, \quad \cos\theta_1 \simeq 1$$

Hence, Eq. 29 can be written as $$d_1 = b \cdot \theta + e \cdot \theta + e \cdot \theta_1 \quad (30)$$

On the other hand, Eq. 31 below gives a moment M at the notch portion 325.

$$M = k_1 \cdot \theta \quad (31)$$
$$= k_3 \cdot \theta_1$$

where $k_1$ is a spring coefficient of the notch portion 325 which functions as a fulcrum of elasticity, and $k_3$ is a spring coefficient of the notch portion 328 which similarly functions as a fulcrum of elasticity.
Then, from Eq. 31, $$\theta_1 = (k_1/k_3)\theta \quad (32)$$

Substituting Eq. 32 in Eq. 30 and reducing Eq. 30 give $$d_1 = (b + e + (k_1/k_3)e)\theta \quad (33)$$

Next, explanations will be given on how a rotational movement mechanism employing a rotation spring instead of the plate spring 316 would operate when a parallel movement mechanism 350 makes parallel movement.

Assuming that a piezoelectric element 330 has extended itself by a length dP so that the parallel movement mechanism 350 has moved by a distance x, a beam-to-beam distance adjuster 300 satisfies the following relation.

$$x = \frac{H(b + e + (k_1/k_3)e)}{(H - h_1)} \theta \quad (34)$$

This means that a beam director 301 can be rotationally displaced while never failing to satisfy Eq. 7 in a notched link mechanism 303 which is designed so as to satisfy the relation below.

$$2a = \frac{H(b + e + (k_1/k_3)e)}{(H - h_1)}$$

Hence, the same results as those described in relation to the embodiment earlier explained can be attained.

In the embodiments given heretofore, a means for deflecting a link mechanism comprises a piezoelectric element 330 (as an actuator) and a rotation angle control unit 400 which drives the piezoelectric element 330. However, the means for deflecting a link mechanism is not limited to this combination, but other suitable elements may be used. Instead of the piezoelectric element 330, a micrometer, for example, may be mounted to an arm member 311. Desired deflection of link mechanism is obtainable by manually operating the micrometer.

While the invention has been shown and described in detail, the foregoing description is in all aspects illustrative and not restrictive. It is understood that numerous modifications and variations can be devised without departing from the scope of the invention.

What is claimed is:

1. An optical beam scanning apparatus for deflecting a plurality of optical beams and scanning photosensitive material with said deflected optical beams, said optical beam scanning apparatus comprising:
   (a) means for generating a plurality of optical beams;
   (b) means for modulating said plurality of optical beams;
   (c) beam turning means for turning modulated optical beams to thereby produce a beam group consisting of optical beams which intersect each other at a prescribed point;
   (d) means for rotationally displacing said beam turning means to thereby change an angle of intersection of said optical beams, said displacing means including:
      (d-1) a link mechanism comprising first to third arm members, said first and second arm members linked to each other through a first link node, said second and third arm members linked to each other through a second link node, both ends of said link mechanism supported at predetermined points through third and fourth nodes, respectively,
      (d-2) a supporting member connected to said beam turning means, said supporting member linked to said second arm member through a fifth link node,
      (d-3) an elastic member extending from said supporting member in a different direction from a longitudinal one of said second arm member,
      (d-4) a projection member provided between said first arm member and a leading edge portion of said elastic member, and
      (d-5) means for actuating said link mechanism in link motion;
   (e) deflecting means for periodically deflecting said beam group; and
   (f) focusing means for focusing each optical beam of said deflected beam group on said photosensitive material.

2. An optical beam scanning apparatus in accordance with claim 1, wherein said deflecting means is disposed at said prescribed point where said optical beams from said beam turning means intersect each other.

3. An optical beam scanning apparatus in accordance with claim 2, wherein said deflecting means comprises an acousto-optic deflector.

4. An optical beam scanning apparatus in accordance with claim 1, wherein said link mechanism, said supporting member and said elastic member are cut from one elastic metal block.

5. An optical beam scanning apparatus in accordance with claim 1, wherein said actuating means comprises an actuator connected with said link mechanism and a controlling unit for controlling said actuator to extend or shrink.

6. An optical beam scanning apparatus in accordance with claim 5, wherein said actuator is a piezoelectric element.

7. An optical beam scanning apparatus in accordance with claim 5, wherein said controlling unit comprises:
   a laser source for emitting a laser beam;
   a mirror secured on said second arm member for reflecting said laser beam from said laser source;
   detector for detecting a laser beam reflected by said mirror to output a signal corresponding to a rotation angle of said mirror; and
   a controller for controlling the operation of said actuator on the basis of said signal.

* * * * *